Patented Feb. 6, 1945

2,369,109

UNITED STATES PATENT OFFICE 2,369,109

METHOD OF REFINING POLYMERIZED ROSIN ESTERS

Alfred L. Rummelsburg, Wilmington, Del., assignor to Hercules Powder Company, Wilmington, Del., a corporation of Delaware No Drawing. Application February 8, 1941,
Serial No. 378,056

6 Claims. (Cl. 260—103)

This invention relates to polymerized rosin esters and more particularly to a process for the refining of such materials.

Several methods have been described in the art for effecting an increase in the melting point of rosin esters. Thus rosin esters have been treated with polymerizing agents such as, for example, sulfuric acid, boron trifluoride, metallic halides such as stannic chloride, etc. After polymerization by any of the known methods such as those indicated above, the color of the polymerized product is not usually satisfactory for most purposes. The known procedures for refining ordinary rosin esters have proved unsatisfactory for refining of polymerized rosin esters due to the fact that they do not satisfactorily improve the color and particularly because they have a tendency to decrease the melting point of the polymerized product, thereby defeating the original purpose of the polymerizing treatment. Also, a material decrease in yield results when the usual rosin ester refining procedures are employed.

It is an object of this invention to provide an improved process for refining polymerized rosin esters. It is a further object to provide an improved process for refining polymerized rosin esters which is extremely simple and economical. It is a still further object to provide a process for refining polymerized rosin esters which will provide a refined product of improved color in a substantially quantitative yield based on the polymerized rosin ester treated. Other objects of the invention will appear hereinafter.

The above objects are accomplished in accordance with this invention by heating a polymerized rosin ester at a temperature within the range of about 250° to about 325° C. without substantial distillation thereof until the color of the polymerized product has been appreciably improved and until color-forming impurities have been substantially completely removed. The resulting refined polymerized rosin ester is obtained with practically no loss in yield and with substantially no decrease in melting point. The color will be substantially lighter than the original polymerized rosin ester.

The polymerized rosin esters which may be refined in accordance with this invention will include polymerized monohydric alcohol esters and polymerized polyhydric alcohol esters of rosins which have been prepared by any of the methods well known in the art. Thus they will include polymerized forms of the methyl, ethyl, propyl, butyl, ethylene glycol, propylene glycol, diethylene glycol, triethylene glycol, trimethylene glycol, glycerol, pentaerythritol, etc. esters of the various rosins, either wood or gum, or the acids thereof. They may be produced by contacting a rosin ester with a polymerization catalyst, such as for example, sulfuric acid, phosphoric acid, organic substituted sulfuric acids, boron trifluoride, metallic halides as stannic chloride, zinc chloride, aluminum chloride, hydrofluoric acid, or by treatment with a high voltage, high frequency discharge, as well as by other methods. Alternatively, the process may be carried out on the equivalent esters obtained by esterification of polymerized rosin with alcohols such as those named above.

The polymerized rosin esters which may be refined in accordance with this invention will be those having a drop melting point from about 5° C. to about 100° C. above the melting point of the original rosin ester used in the polymerization.

The heat treatment of polymerized rosin esters carried out in accordance with this invention is preferably performed after the solvent and catalyst have been removed from the polymerized material. The treatment is facilitated and more beneficial results are obtained by carrying out the heating in the presence of an inert permanent gas such as, for example, carbon dioxide, carbon monoxide, nitrogen, or mixtures of such gases such as stack gases, etc. Also, where the polymerized rosin ester contains some difficultly removable color-forming impurity such as a small amount of sulfur present in the polymerized product obtained by use of a sulfuric acid type catalyst such as sulfuric acid, organic substituted sulfuric acid, etc., it will be desirable to pass a stream of the inert permanent gas through the polymerized rosin ester during the heat treatment process. In this manner the stream of gas aids in the removal of the sulfur or other color-forming volatile impurity.

The time required to refine polymerized rosin esters in accordance with this invention will depend on a number of factors such as the particular polymerized ester employed, the temperature of heat treatment, the amount and nature of the inert gas which is utilized, and the efficiency with which heat is transferred through the molten polymerized material. The heat treatment may be carried out at any temperature within the range of about 250° to about 325° C. and more preferably at a temperature of about 250° to about 280° C. Thus, for example, with a polymerized rosin ester obtained by use of concentrated sulfuric acid as catalyst, heat treatment at 300° C. for ten minutes with use of a stream of carbon dioxide is sufficient. On a similar polymerized rosin ester at a temperature of 265° C. a time of twenty-five minutes will be required. With polymerized rosin esters obtained by other procedures correspondingly longer or shorter times will be used. In general, the time required to provide a satisfactorily refined polymerized rosin ester will fall within the range of about five minutes to about one hour.

As stated above, the heat treatment of polymerized rosin esters in accordance with this invention will be carried out under conditions which substantially prevent any distillation of the rosin ester so that the yield of refined product is substantially quantitative. Thus, at the higher temperatures of treatment the amount of inert permanent gas which may be passed through the polymerized rosin ester will be held to a minimum. The heat treatment may be carried out batch-wise or in a continuous manner. In carrying out the treatment continuously the polymerized material may be passed through a heat exchanger or other suitable device in such a manner as to provide the desired time of contact.

As illustrative of the improved process of refining polymerized rosin esters in accordance with this invention, the following examples are cited as typical of the various modes of carrying out the invention. Where colors are shown in the examples they represent the Lovibond glass colors measured on 7/8 inch cubes of the polymerized products or when expressed as letters represent the colors of 7/8 inch cubes according to the U. S. Rosin Color Standards.

Example I

To a solution of 450 grams of methyl abietate in 600 grams of benzene 113 grams of 95% sulfuric acid were added over a period of 15 minutes with agitation while maintaining the temperature at 15 to 20° C. Agitation was then continued for 2 hours while maintaining the same temperature. The benzene solution was then decanted from the separated sludge, washed thoroughly with water and the solvent removed under reduced pressure. The resulting polymerized ester was soft and resinous and melted at 50° C. by the drop method. It was heated at 300° C. for a period of 5 minutes while at the same time passing a stream of carbon dioxide through the material. A color improvement from 27 Amber to 15 Amber resulted and the refined product was substantially free from traces of sulfur.

Example II

A solution of 450 grams of the glycerol ester of K wood rosin in 600 grams of benzene was polymerized by treatment with 113 grams of 95% sulfuric acid added over a period of 20 minutes with agitation while maintaining a temperature of 15 to 20° C. The agitation was continued for an hour at the same temperature and the benzene solution decanted from the separated sludge. The benzene solution was then heated with 500 grams of aqueous 50% sulfuric acid solution at 80° C. for one hour to hydrolyze emulsion forming constituents, the sulfuric acid layer removed and the benzene solution washed thoroughly with water. The solvent was then removed under reduced pressure and a polymerized ester gum melting at 115° C. compared with an original 90° C. resulted. The ester was subjected to a heat treatment at 300° C. for 5 minutes while passing a stream of carbon dioxide through the material. A color improvement from 80 Amber+10 Red to 80 Amber+3 Red was realized.

Example III

A polymerized ester gum obtained by treatment of K wood rosin ester gum with hydrofluoric acid and having a drop melting point of 130° C. was heated at 300° C. for a period of 10 minutes in an inert atmosphere. A color improvement from an H grade to an N grade was obtained.

Example IV

To a solution of 300 grams of ester gum in 100 grams of toluene, 30 grams of anhydrous stannic chloride were added with shaking. The solution was allowed to stand for 48 hours at a temperature of 25 to 30° C. and then washed with a 10% sulfuric acid solution to decompose metal resinates, washed thoroughly with water and the solvent then evaporated under reduced pressure. A polymerized ester gum melting at 105° C. compared with an original 87° C. resulted. It was heated at 315° C. for a period of 5 minutes in an inert atmosphere whereupon a color improvement from an H grade to a K+ grade occurred.

It will be obvious from the above examples and description that the heat treatment of polymerized rosin esters in accordance with this invention is both extremely simple and economical. The color improvement of the polymerized product obtained is remarkable, particularly in view of the fact that substantially no loss in yield is encountered.

The polymerized rosin esters of improved color obtained in accordance with this invention will be considerably more useful in commercial applications, such as in the production of varnishes, lacquers, etc. It is to be understood that the term "refining" used throughout this invention refers particularly to the color improvement of polymerized rosin esters and not necessarily to a separation of the polymerized rosin ester into light-colored and dark-colored fractions.

It will also be understood that the details and examples hereinbefore set forth are illustrative only, and that the invention as broadly described and claimed is in no way limited thereby.

What I claim and desire to protect by Letters Patent is:

1. A method of refining a polymerized rosin ester which comprises heating a material consisting essentially of a polymerized rosin ester at a temperature within the range of about 250 to about 325° C. without substantial distillation of the material and without substantial change in the chemical constitution of the ester for a period of time sufficient to effect a substantial improvement in the color of the material.

2. A method of refining a polymerized rosin ester which comprises heating a material consisting essentially of a polymerized rosin ester at a temperature within the range of about 250° C. to about 325° C. and at the same time passing a stream of an inert permanent gas into the said polymerized rosin ester without substantial distillation thereof and without substantial change in the chemical constitution of the ester for a period of time sufficient to effect a substantial improvement in the color of the polymerized rosin ester.

3. A method of refining a polymerized rosin ester which has been obtained by polymerization of a rosin ester with a sulfuric acid type catalyst which comprises heating a material consisting of said polymerized rosin ester at a temperature within the range of about 250° C. to about 325° C. without substantial distillation thereof and without substantial change in the chemical constitution of the ester for a period of time sufficient to effect a substantial improvement in the color of the polymerized rosin ester.

4. A method of refining a polymerized rosin ester which has been obtained by polymerization of a rosin ester with a sulfuric acid type catalyst which comprises heating a material consisting essentially of said polymerized rosin ester at a temperature within the range of about 250° C. to about 325° C. and at the same time passing a stream of an inert permanent gas into the said polymerized rosin ester without substantial distillation thereof and without substantial change in the chemical constitution of the ester for a period of time sufficient to effect a substantial improvement in the color of the polymerized rosin ester.

5. A method of refining a polymerized rosin ester which has been obtained by polymerization of a rosin ester with a sulfuric acid type catalyst which comprises heating a material consisting essentially of said polymerized rosin ester at a temperature within the range of about 250° C. to about 325° C. and at the same time passing a stream of carbon dioxide into the said polymerized rosin ester without substantial distillation thereof and without substantial change in the chemical constitution of the ester for a period of time sufficient to effect a substantial improvement in the color of the polymerized rosin ester.

6. A method of refining a polymerized rosin ester which has been obtained by polymerization of a rosin ester with a sulfuric acid type catalyst which comprises heating a material consisting essentially of said polymerized rosin ester at a temperature within the range of about 250° C. to about 325° C. and at the same time passing a stream of an inert permanent gas into the said polymerized rosin ester without substantial distillation thereof and without substantial change in the chemical constitution of the ester for a period of time from about 5 minutes to about 1 hour to effect a substantial improvement in the color of the polymerized rosin ester.

ALFRED L. RUMMELSBURG.